United States Patent [19]
Franks, Jr.

[11] Patent Number: 5,160,271
[45] Date of Patent: Nov. 3, 1992

[54] ADJUSTABLE TELEPHONE INTERFACE MOUNTING CLAMP

[76] Inventor: George J. Franks, Jr., 127 Duntrune, Inverness, Ill. 60067

[21] Appl. No.: 766,598

[22] Filed: Sep. 26, 1991

Related U.S. Application Data

[63] Continuation-in-part of Ser. No. 679,895, Apr. 3, 1991, Pat. No. 5,114,895, which is a continuation-in-part of Ser. No. 320,360, Mar. 8, 1989, Pat. No. 5,006,074, which is a continuation-in-part of Ser. No. 204,397, Jun. 9, 1988, Pat. No. 4,993,960, which is a continuation-in-part of Ser. No. 116,899, Nov. 5, 1987, Pat. No. 4,828,504.

[51] Int. Cl.[5] ............................................. H01R 4/66
[52] U.S. Cl. ...................................... 439/92; 439/803
[58] Field of Search ................. 439/92, 95, 100, 801, 439/803; 174/3 B, 51

[56] References Cited

U.S. PATENT DOCUMENTS

| | | | |
|---|---|---|---|
| 3,502,785 | 3/1970 | Nickola | 174/38 |
| 3,614,538 | 10/1971 | Nickola | 174/38 |
| 4,993,960 | 2/1991 | Franks, Jr. | 439/92 |
| 5,006,074 | 4/1991 | Franks, Jr. | 439/92 |
| 5,033,971 | 7/1991 | Franks | 439/92 |

Primary Examiner—Eugene F. Desmond
Attorney, Agent, or Firm—Jenner & Block

[57] ABSTRACT

A clamp for mounting and grounding a telephone interface box to an electric utility box of variable width is provided. The clamp has base which spans one side of the box. The base is adjustable through a range of finely graduated widths. Arms extend from the ends of the base and are positioned to engage opposite sides of the box. A sliding plate is mounted on one of the arms to secure the clamp to the box. A mounting plate secures the telephone interface box to one of the arms. In one embodiment, an abrading bolt also mounted on one of the arms to make intimate electrical contact with the box.

26 Claims, 5 Drawing Sheets

ADJUSTABLE TELEPHONE INTERFACE MOUNTING CLAMP

RELATED APPLICATIONS

This is a continuation-in-part of application Ser. No. 07/679,895, filed Apr. 3, 1991, now U.S. Pat. No. 4,114,895, which itself is a continuation-in-part of application Ser. No. 07/320,360, filed Mar. 8, 1989, which issued as U.S. Pat. No. 5,006,074 on Apr. 9, 1991, which itself is a continuation-in-part of application Ser. No. 07/204,397, filed Jun. 9, 1988, which issued as U.S. Pat. No. 4,993,960 on Feb. 19, 1991, which itself is a continuation-in-part of application Ser. No. 07/116,899, filed Nov. 5, 1987, which issued as U.S. Pat. No. 4,828,504 on May 9, 1989.

FIELD OF THE INVENTION

The present invention relates to adjustable clamps for providing mechanical and electrical connection between two objects. In a particular embodiment, a clamp for mounting a telephone interface box to an electric utility box is provided. In another embodiment, a clamp for providing a mechanical and electrical connection between a ground wire and an electric utility box is provided.

BACKGROUND OF THE INVENTION

In providing telephone service to a building, a telephone line from the telephone company is typically connected to a telephone system interface box by an overhead riser or buried underground cable. Conventional telephone wiring then runs from the telephone interface to provide the telephone service. Because the telephone system needs to be grounded, a wire of relatively low gauge is connected at one end to the telephone interface box and at its other end to an elongated ground rod sunk into the ground.

The telephone interface box itself typically mounted to a wall of the building being serviced. The telephone interface box may be mounted to the wall in any one of a variety of known ways. The telephone interface box, for example, can be bolted to the wall or attached to a bracket which is mounted to a wall. The mounting typically requires drilling holes into the wall for the bolts, screws or brackets.

While the foregoing procedure provides adequate mounting of the telephone interface box, a better method is to employ a clamp which is securable to an electric utility box. Typically, the electric utility box will already have been mounted to the wall of the building. The telephone interface box can then be connected to a plate that forms part of the clamp, eliminating the need to separately mount the telephone interface box to the wall of the building.

Such a clamp is disclosed in U.S. Pat. No. 5,018,984 issued to Franks, Jr., on May 28, 1991. The clamp disclosed in that patent is not adjustable to fit electric utility boxes of variable size. Thus, a clamp that is adjustable to the width of a particular utility box would be desirable.

When installing these interface or utility boxes, utility companies, such as providers of telephone and electric service, typically provide separate electrical grounding for each type of service. For example, an electric utility box is usually grounded by a heavy gauge wire which is connected to an elongated ground rod sunk into the nearby ground. Likewise, the adjacent telephone interface box is grounded by a wire of lower gauge which is connected to a second elongated ground typically sunk within several feet of the power ground rod.

To reduce the potential difference between the telephone interface box and electric utility box, it is necessary to connect a jumper wire or the like between the telephone system ground rod and electrical power system ground rod to prevent differences in potential which could result in electric arcing between the telephone interface box and the electric utility box in the event of lightning or accidental contact with the telephone line, for example. This procedure is complicated by the fact that it is often impossible or impractical to open or penetrate the electric utility box. Therefore, a jumper wire or the like must be installed by digging to expose the buried power ground rod.

While the foregoing procedure works, an easier and less expensive method is to employ a clamp which provides a common ground by mechanically and electrically connecting a grounding wire for the telephone interface box to the electric utility box. To be effective, such clamps must be able to penetrate dirt, corrosion and nonconductive coatings which may be on the electric utility box. They must also be able to conduct a high amperage current to ground, as might occur in a lightning strike, without premature failure. Such a clamp is disclosed in U.S. Pat. No. 5,006,074 issued to Franks, Jr. on Apr. 9, 1991. While this clamp is an excellent device for creating a single grounding system, it does not provide structure for mounting a telephone interface box on an electric utility box. Nor does the earlier-described mounting clamp provide intimate electrical contact for grounding with an electric utility box. Ideally, a single adjustable clamp would provide both grounding and mounting features.

An important feature of the existing grounding clamp disclosed in U.S. Pat. No. 5,006,074 is that it is adjustable to fit boxes of various widths. The clamp is generally U-shaped in cross section and has a base adjustable in length. Two fixed arms extend from the adjustable base. In operation, the adjustable base is adjusted to the approximate width of the electric utility box. The clamp is placed over the box, and the two fixed arms engage and bracket the box.

A limitation with the foregoing existing clamp is that its base is only adjustable in coarse graduations. A screw or bolt in one of the fixed arms provides fine adjustment. While the adjustment screw is adequate, the clamp would be stronger and more reliable if the base could be more precisely adjusted to more nearly the actual width of the box to which the clamp is applied.

SUMMARY OF THE INVENTION

In accordance with the present invention, a new adjustable clamp is disclosed which can be used to mount and ground an object such as a telephone interface box to a box-shaped enclosure, such as an electric utility box. In one embodiment, the clamp includes an base which is placed over the top of the utility box. The length of the base can be adjusted to fit the width of the box. Two arms extend down from the base and engage opposite sides of the utility box. A securing device mounted on one of the arms secures the clamp to the box. Finally, a mounting plate secures the telephone interface box to the clamp.

Because the base is adjustable, the clamp may be installed on boxes having widths within a desired specified range. The adjustable base comprises two overlapping elongated members. One of the members has a plurality of (and preferably numerous) overlapping holes along its length. The other member has at least one alignment hole which can be aligned with any one of the overlapping holes. A threaded bolt or other suitable fastening member is placed through the alignment hole and into a selected one of the overlapping holes so that the desired base length is provided. In this manner, the two members are secured together and determine a discrete length of the base.

In another embodiment, the clamp also includes a grounding screw or bolt. This bolt is mounted onto one of the arms and has an abrading end which enables it to penetrate paint and other nonconductive coatings on the adjacent wall of the utility box. This places the grounding bolt (and, consequently, the whole clamp and attached telephone interface box) in intimate electrical contact with the utility box.

In yet another embodiment, the clamp includes the grounding screw, but does not have a mounting plate. This embodiment is used to simply provide mechanical and electrical connection to a box which is electrically grounded. Because the holes on one of the elongated base members are overlapping, the base can be precisely adjusted to closely fit the width of a particular box so that the base can easily be tightened against the box.

DESCRIPTION OF THE PREFERRED EMBODIMENTS

The invention can be more completely understood from the following description of the preferred embodiments in conjunction with the figures in which like reference numerals represent like elements.

Figure 1:
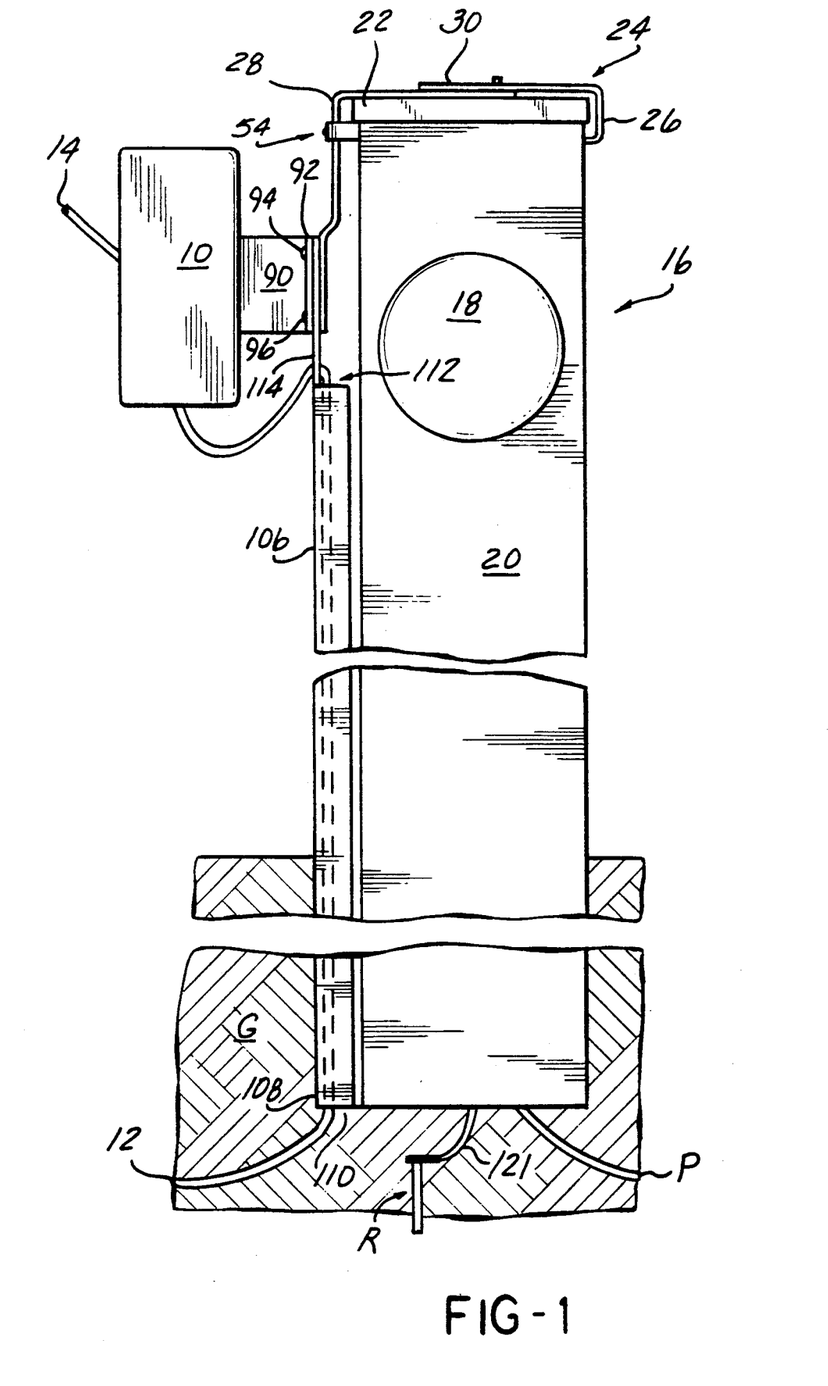
FIG. 1 is a front plan view of one embodiment of the invention shown in position to mount a telephone interface box onto an electric utility box.

Telephone service is typically connected to a building through overhead risers or buried underground cables to interface equipment located on the outside of the building. FIG. 1 illustrates some of this telephone system interface equipment. A telephone interface box 10 is connected to the external telephone company system by underground telephone line feed 12. Alternatively, a telephone interface box 10 could be connected to overhead wires by a hollow conduit or riser (not illustrated) extending upwardly. Telephone lines are connected through telephone interface box 10 to the building's telephone system through conventional wiring 14. Telephone interface box 10 must also be grounded suitably to the ground G in the event that lightning or accidental electrical contact should be made to the telephone wires themselves (not illustrated). Techniques for achieving this are discussed below.

Electric power is also typically connected through overhead risers or underground cables to interface equipment located on the outside of a building. For example, as illustrated in FIG. 1, an electric utility box 16 of rectangular shape mounts a power meter 18 for determining the amount of power consumption being utilized in the building. The utility box 16 may include an elongated structure 20 extending downwardly and partially buried into the ground G through which power cables P would be led from an underground feeder system, or alternatively, from a hollow conduit or riser extending upwardly in the case of overhead service (not illustrated). A metal cap or lip 22 encloses the top of utility box 16. Utility box 16 is electrically grounded to ground G by a ground rod assembly generally indicated at R.

Telephone interface box 10 is typically attached to a wall of the building being serviced (not illustrated). This requires drilling holes into the walls of the building with telephone interface box 10 being secured directly to the wall of the building. The attachment of a telephone interface box, such as box 10, to a side of the building is conventional and may take a wide variety of known configurations.

Alternatively, an easier and less expensive way to mount telephone interface box 10, illustrated in FIG. 1, is to mount it to electric utility box 16 using a mounting clamp, such as disclosed by U.S. Pat. No. 5,018,984, issued to Franks, Jr. on May 9, 1989, the disclosure of which is hereby incorporated by reference. One difficulty with such clamps is that they are not adjustable and can be used only for electric utility boxes of a predetermined limited range of widths, generally equal to the length of an adjustment screw. To overcome this limitation, in accordance with the invention, an adjustable clamp 24 is provided for mechanically connecting the telephone interface box 10 to boxes, such as utility box 16, and is useful for a wide range of box widths. While adjustable clamp 24 is illustrated in connection with electric utility box 16, it will be apparent that adjustable clamp 24 can be used anytime an object is to be mounted onto a box enclosure, or similar device, in the width size range that adjustable clamp 24 can accommodate. The mounting can be for purposes of convenience or for any other purpose for which a mechanical connection is to be made to a box enclosure.

Figure 2:
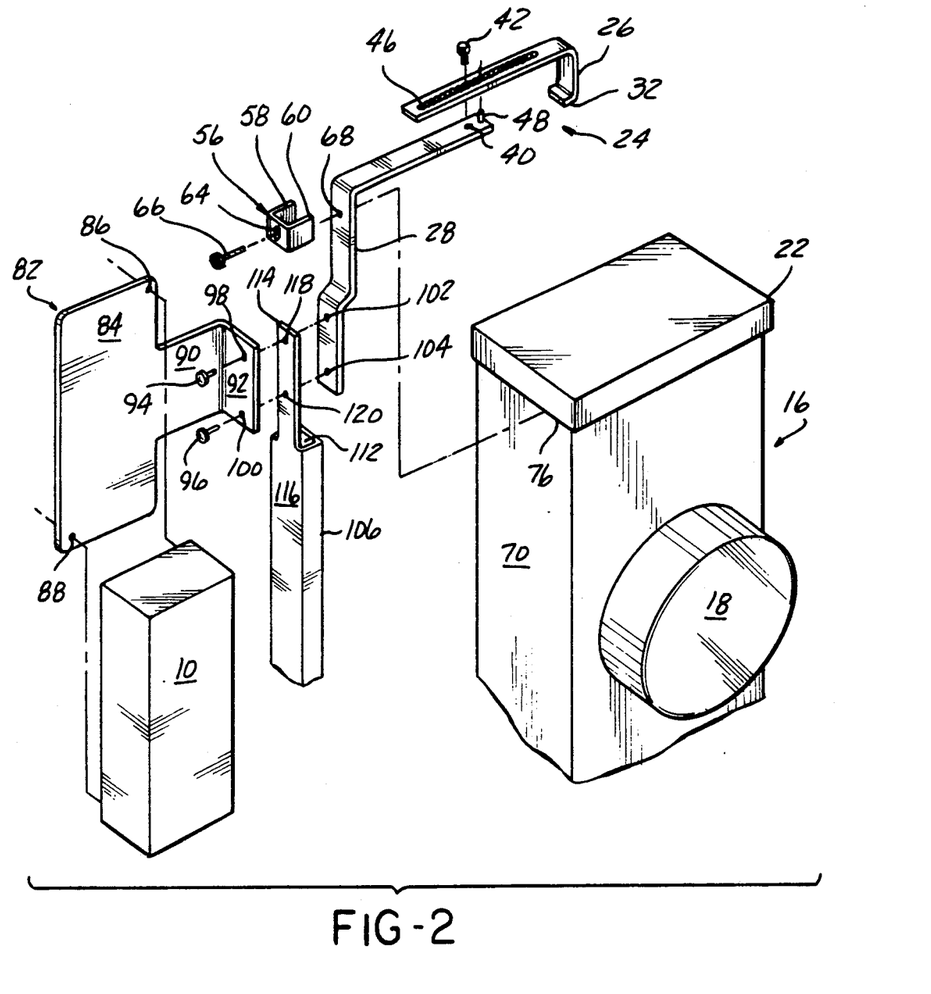
FIG. 2 is an exploded perspective view of the embodiment shown in FIG. 1.
Figures 3, 4:
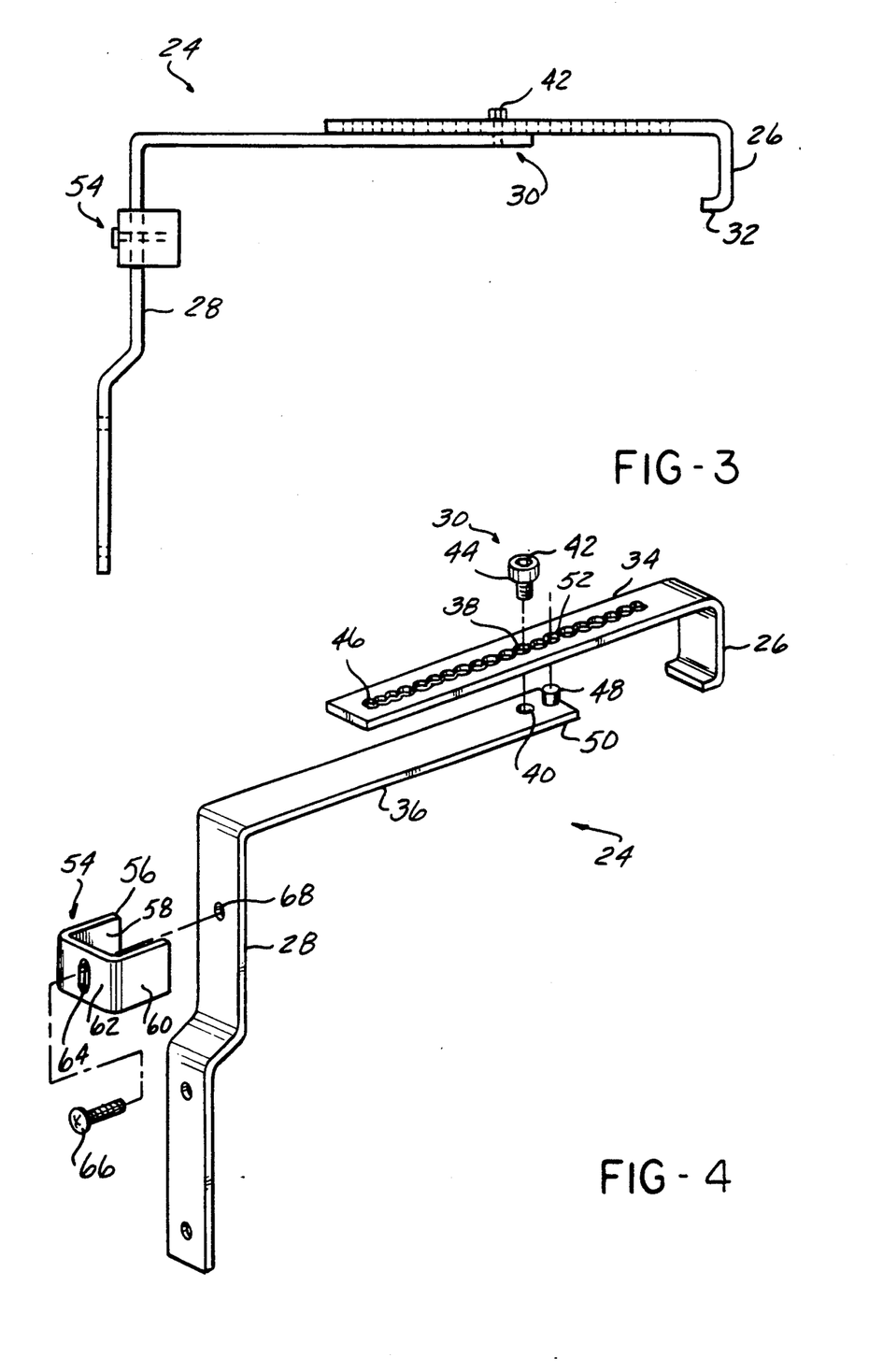
FIG. 3 is an enlarged front plan view of the clamp shown in FIG. 1.
FIG. 4 is an exploded perspective view of the clamp shown in FIG. 3.

Referring to FIGS. 1 through 3, adjustable clamp 24 has a first arm 26 and a second arm 28 attached to an adjustable base 30 composed of members 34 and 36. First arm 26 and second arm 28 extend outwardly from adjustable base 30 to engage and bracket utility box 16 therebetween, as will be apparent. Additionally, first arm 26 has an extension 32 located at its lower end, which engages the adjacent side of utility box 16 when clamp 24 is secured thereto.

As illustrated in FIG. 3, second arm 28 is longer than first arm 26, and the two arms are substantially parallel to each other. In a preferred embodiment, however, second arm 28 forms an angle slightly less than 90°

(preferably about 85°) with adjustable base 30. First arm 26 is thus preferably slightly inclined at its lower edge toward second arm 28. The slight inclination allows the first and second arms 26 and 28 to be slightly biased against utility box 16 when the clamp 24 is placed thereon.

Figure 5:
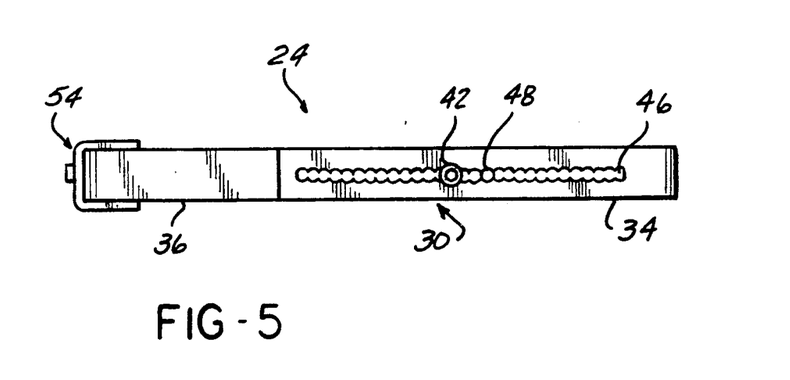
FIG. 5 is a top view of the clamp shown in FIG. 3.
Figure 6:
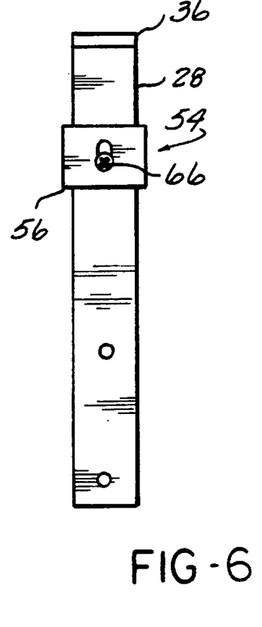
FIG. 6 is a side view of the clamp shown in FIG. 3.
Figure 7:
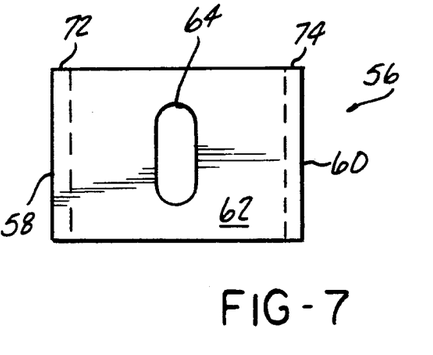
FIG. 7 is a front view of a sliding plate.
Figure 8:
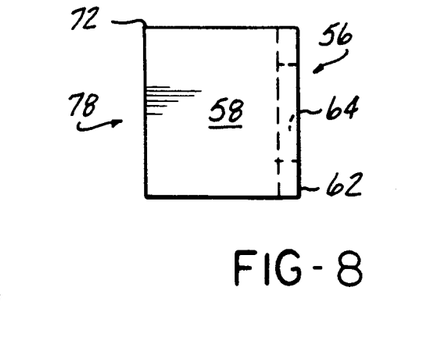
FIG. 8 is a side view of the sliding plate of FIG. 7.
Figure 9:
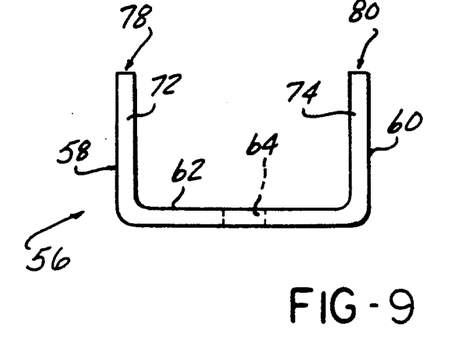
FIG. 9 is a top view of the sliding plate of FIG. 7.

An important novel feature of adjustable clamp 24 is that it is adjustable through a substantial range of finely graduated widths. The mechanism which allows this adjustment is best illustrated in FIGS. 4 and 5. The adjustable base 30 is made up of two separate, elongated members 34 and 36 which are secured to each other as hereafter described and are also rigidly connected to arms 26 and 28, respectively, and can form an integral portion thereof. First arm 26 extends from first elongated member 34, and second arm 28 extends from second elongated member 36. First and second elongated members 34 and 36 have holes 38 and 40, respectively, for use in securing elongated members 34 and 36 together.

Hole 40 is threaded to receive a bolt 42 therein. When holes 38 and 40 are aligned, bolt 42 passes through hole 38 and is tightened into threaded alignment hole 40. A washer 44 is integral with bolt 42, and is of a diameter greater than hole 38. The bolt 42 has a length which is approximately equal to or slightly less than the combined thickness of the elongated members 34 and 36. If the length of bolt 42 is longer than this combined thickness, a portion of bolt 56 will protrude out of hole 40 upon tightening. This protrusion will prevent clamp 24 from lying flat against electric utility box 16.

Although bolt 42 is illustrated as securing first and second elongated members 34 and 36, other securing devices, such as clips or a nut and a flanged bolt (thereby eliminating the need for holes 38 and 40 having threads) and the like, may be used. Further, while first elongated member 34 is illustrated as being on top of second elongated member 36, the reverse is also possible. Alternatively, holes 38 and 40 may both be threaded.

The length of base 30 can be varied within a predetermined range of lengths so that adjustable clamp 24 can be secured to electric utility boxes 16 in a wide range of varying widths. Specifically, first elongated member 34 has a plurality of holes in addition to and including hole 38. As best seen in FIG. 5, these holes, generally indicated by reference numeral 46, are formed along the same linear path and are each capable of receiving bolt 42 therethrough. Preferably, each of holes 46 slightly overlaps with its adjacent hole or holes. When any one of holes 46 (including hole 38) is aligned with hole 40 and bolt 42 is received in the aligned hole to secure the first and second elongated members 34 and 36 together, a discrete length for base 30 is formed. Because holes 46 are slightly overlapping, they create a plurality of discrete but finely graduated, predetermined lengths of base 30. Alternatively, each of holes 46 could be separated by a fixed distance. Further, if a nut and flanged bolt fastener is used so that holes 46 do not require threads, holes 46 could be replaced by a single elongated slot (not shown).

An upright finger 48 is formed on the end portion 50 of the second elongated member 36. Finger 48 is positioned on the second elongated member 36 so that upon the clamping together of the first and second elongated members 34 and 36 by the screw 42, finger 48 fits snugly within one of holes 46 such as hole 52. Finger 48 in conjunction with screw 42 keeps first and second elongated members 34 and 36 in linear alignment with each other. Depending upon manufacturing tolerances, finger 48 may have a slight play or adjustment within one of holes 46, which allows pair of elongated members 34 and 36 to skew slightly or become scissored with respect to each other. A slight skew is generally not a problem, because pair of elongated members 34 and 36 will generally jam tightly against each other as securing bolt 42 is tightened.

The use of fixed finger 48 allows adjustable clamp 24 to be economically manufactured with a minimum of parts. However, alternative constructions are possible, so long as two spaced securing means are formed between the elongated base members to keep the members in alignment once interconnected.

Once clamp 24 has been adjusted to the proper width, it must be secured to electric utility box 16. This is accomplished by a securing device, generally indicated by reference numeral 54 in FIG. 3. Securing device 54 is included on second arm 28, and forms a mechanical connection with utility box 16. As illustrated in FIGS. 4 and 6-9, securing device 54 includes a sliding plate 56. Sliding plate 56 can be considered C-shaped or U-shaped and includes a first leg 58 and a second leg 60 extending outwardly from a common base 62. First leg 58 and the second leg 60 are preferably substantially parallel to each other. Base 62 can also be of any suitable shape and has an elongated slot 64.

As best shown in FIGS. 2 and 4, a securing bolt 66 is inserted and movable within a threaded hole 68 in second arm 28 for securing sliding plate 56 to second arm 28. Bolt 66 preferably extends substantially perpendicular to second arm 28 and therefore extends substantially perpendicular relative to side 70 of utility box 16, as seen in FIG. 2. Bolt 66 is received through slot 64 before being received in hole 68. First and second legs 58 and 60 have sufficient length to reach side 70 when sliding plate 56 is secured against second arm 28. A washer (not shown) can also be placed on bolt 66 between base 62 and the head of bolt 66.

The securing of clamp 24 to utility box 16 is illustrated in FIGS. 1 and 2. When clamp 24 is placed on utility box 16, first and second arms 26 and 28 engage adjacent sides of utility box 16. Bolt 66 is placed through slot 64 and into hole 68. Sliding plate 56 is then moved upward or downward, as appropriate, through the length of elongated slot 64 until upper edges 72 and 74 (see FIGS. 7-9) of first and second legs 58 and 60, respectively, contact bottom edge or lip 76 of lid 22. Bolt 66 is then tightened to secure sliding plate 56 in this position. The resulting position of sliding plate 56 is that front surfaces 78 and 80 (see FIGS. 8 and 9) of first and second legs 58 and 60, respectively, abut side 70 of utility box 16, and upper edges 72 and 74 of first and second legs 58 and 60, respectively, abut lower edge 76 of lid 22.

It will be observed that because alignment holes 46 overlap, base 30 may be adjusted in fine (as opposed to coarse) graduations. This enables base 30 to be adjusted in width to very closely fit electric utility box 16, thereby improving the effectiveness of clamp 24. Moreover, securing device 54 need not be used for fine adjustment, and may therefore be fixed and rigid like sliding plate 56.

As illustrated in FIG. 1, telephone interface box 10 or alternatively, any other suitable component of the telephone system, is capable of being mounted directly to a plate 82, which in turn can be mounted onto clamp 24.

Plate 82 has a mounting portion 84 to which telephone interface box 10 is secured with bolts (not shown) through holes 86 and 88, or alternatively, in any conventional or known manner. An extension portion 90 is provided that is integral and in substantially the same plane with mounting portion 84, with extension portion 90 in turn being joined to an attachment portion 92. Attachment portion 92 is substantially perpendicular to extension portion 90. Attachment portion 92 is also secured to second arm 28 with bolts 94 and 96, through holes 98 and 100, respectively, in attachment portion 92, and through holes 102 and 104, respectively, in second arm 28. Alternatively, mounting may be accomplished in any known manner. Plate 82 is made of any suitable material, such as a hard plastic or metal, for example.

Underground telephone feed 12 is protected from the environment along at least a part of its length above the ground by a conduit 106. Conduit 106, as illustrated in FIG. 2, is of substantially rectangular cross-sectional area, although conduit 106 could be of any suitable cross-sectional shape. Conduit 106 is constructed of any suitable material, such as metal or hard plastic such as polyvinyl chloride. As illustrated in FIG. 1, lower end 108 of conduit 106 is sunk into the ground along at least a part of the length of side 70 of utility box 16. Double sided tape (not shown) or other known structure or devices can be used to hold lower end 108 in position against side 70. Underground feed 12 is fed through a lower opening 110 through conduit 106, through at least a portion of its length and out of conduit 106 through upper opening 112.

Upper end of conduit 106 has an extension 114, which is essentially a side wall 116 of conduit 106 that has a longer length than the other side walls of conduit 106. Extension 114 is held between second arm 28 and attachment portion 92 by bolts 94 and 96, which pass through holes 118 and 120, respectively, of extension 114. The combination of tape (not shown) and extension 114 effectively holds conduit 106 in place against utility box 16.

By this arrangement, if conduit 106 and plate 82 are made of electrically conductive material a ground connection is possible for the telephone interface box 10 because lower end 108 of conduit 106 is sunk into the ground, while the upper end of conduit 106 is mechanically and electrically connected to interface box 10 through plate 82.

As discussed above, electric utility box 16 must also be electrically connected to ground G through a suitable grounding system. Referring to FIG. 1, a grounding wire 121 runs through elongated structure 20, electrically connecting electric utility box 16 to ground rod assembly R. It is desirable that telephone interface box 10 and electric utility box 16 are each grounded to a common ground. This prevents a difference in electric potential between telephone interface box 10 and electric utility box 16 which could result in arcing.

There are a variety of widely known methods for achieving this objective. For example, telephone interface box 10 can be given its own ground such as through a metal conduit like conduit 106, as described above. A jumper wire must be then provided to electrically connect the grounding system of telephone interface box 10 with the grounding system of the electric utility box.

This arrangement has a number of drawbacks. For example, if telephone line feed 12 is delivered from overhead risers, conduit 106 would be upwardly (as opposed to downwardly) extending. Thus, a second downwardly extending conduit or member would be required for the sole purpose of grounding telephone interface box 10. Moreover, conduit 106 must be made out of metal to function as a grounding system, even if conduit 106 could be less expensively produced from plastic or other nonconducting material. Also, additional labor and materials are required to connect the jumper wire to the telephone interface box ground rod and the electric utility box ground rod.

These drawbacks can be avoided by eliminating the separate telephone ground rod and using a grounding clamp which mechanically and electrically connects a grounding wire from the telephone interface box 10 to the electric utility box 16. Such a clamp is disclosed in U.S. Pat. No. 5,006,074 issued to Franks, Jr. on Apr. 9, 1991, the disclosure of which is hereby incorporated by reference. One limitation with such existing ground clamps is that they do not provide a structure for mounting the telephone interface box 10 onto electric utility box 16. Thus, it is presently necessary to use one clamp for grounding and another for mounting. Ideally, a single adjustable clamp would provide both mounting and grounding features.

Figure 10:
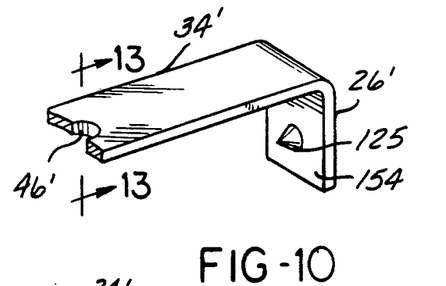
FIG. 10 is a front plan view of a second embodiment of the invention being used to electrically and mechanically attach a grounding wire to an electric utility box.

To this end, a second embodiment of the invention is illustrated in FIG 10 in which an adjustable clamp 24' is provided. Clamp 24' is substantially identical to clamp 24, except that securing device 54 is replaced by an abrading bolt 122 and a ground wire securing screw 124, and extension 32 has is replaced by a conical point 125. As described below, abrading bolt 122 and ground wire securing screw 124 place a ground wire 126 in intimate electrical contact with an electric utility box 128. Conical point 125 helps prevent inadvertent movement of clamp 24' when abrading bolt 122 is tightened.

Electric utility box 128 is mounted to the side of a building (not illustrated). Electric utility box 128 is metal, but is typically covered with paint, dirt and other non-conducting material. A hollow riser 130 extends upwardly toward overhead power supply wires (not shown). Conduit 132 holds a grounding wire 134 which is connected through a clamp 136 to an elongated grounding rod 138 buried in ground G.

Figure 11:
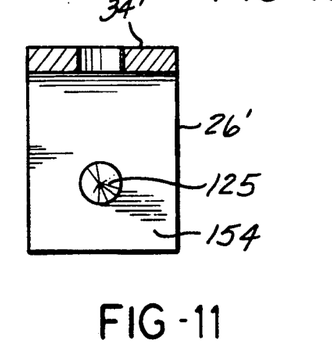
FIG. 11 is an enlarged front view of a threaded bolt utilized in the embodiment of FIG. 10.

As shown in FIG. 11, abrading bolt 122 is fine threaded to permit a greater amount of rotational or turning motion against the side of utility box 128. Bolt 122 is formed of an electrically conducting metal material, such as a heat treated beryllium copper alloy. Although the primary function of bolt 122 is to make intimate electrical contact with utility box 128, the tightening of bolt 122 also serves to secure clamp 24' onto utility box 128.

A hexagonal-shaped head 140 is formed on bolt 122. A bore 142, preferably coaxial with opening 68, is formed through head 140. Bore 142 is threaded to accommodate ground wire securing screw 124. A second bore 144, preferably transverse to bore 142, is also formed through head 140. Ground wire 126 is inserted into the second bore 144. Securing screw 124 functions to secure a ground wire 128 to bolt 122 in bore 142 to establish a mechanical and electrical connection therebetween.

The terminal or free end 146 of bolt 122 has a special end surface 148. A center point 150 extends outwardly from end surface 148. Center point 150 is generally cone-shaped. Preferably, center point 82 extends for a relatively short length past end surface 148. Center point 150 is used to prevent inadvertent movement or "walking" of the clamp 24' as it is being secured.

The edge of end surface 148 is formed with an abrading annular surface comprising grooves and ridges (not illustrated). Reference is made to U.S. Pat. No. 5,006,074 for a more complete description of such construction. Depending on the hardness of the material to which the clamp 24' is to be applied, however, conventional machining techniques used in the fabrication of bolts may provide an abrading surface of sufficient roughness to grind through the coating material of the box and form intimate electrical contact with the base conducting metal of the box. Likewise, other penetrating end surfaces are usable including scoring or cutting. Alternatively, a knife-like edge (not shown) may be provided.

As head 140 of bolt 122 is turned to secure clamp 24' to utility box 128, center point 150 contacts utility box 128 before the abrading end surface 148 and first begins to penetrate the outside surface of utility box 128. As bolt 122 is rotated, the abrading end surface 148 rotates into engagement to penetrate the outer surface of utility box 128. Abrading end surface 148 mechanically scrapes the paint or other coating covering the box, and also penetrates dirt and/or corrosion from the outside surface of utility box 128, to thereby form a sufficient electrical connection. The center point 150, which first penetrates the box, holds the bolt 122 to prevent inadvertent or unwanted movement or "walking" of bolt 122 as abrading end surface 148 is grinding or digging into the surface of the utility box 128.

Figures 12, 13:
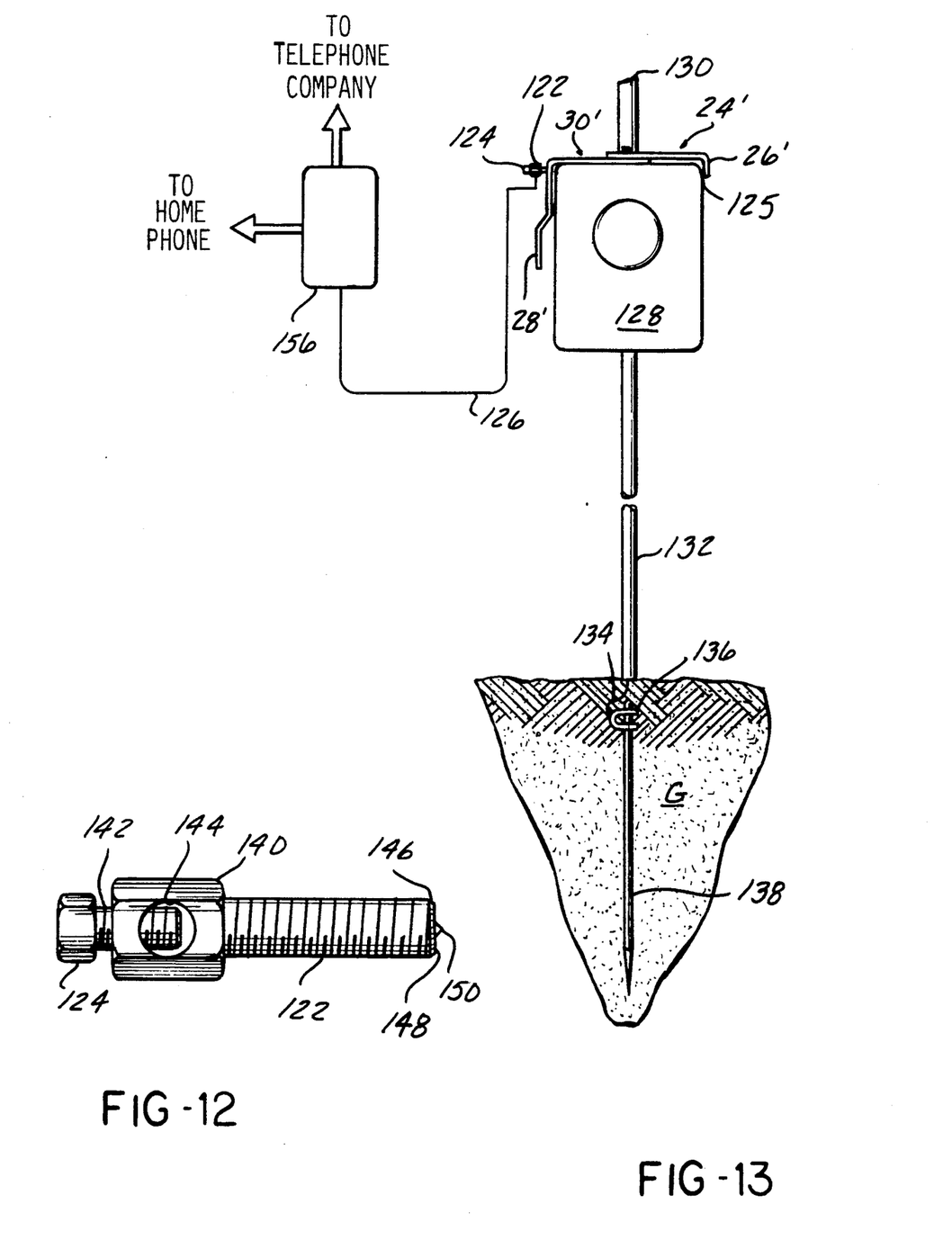
FIG. 12 is a partial perspective view of a portion of the clamp shown in FIG. 10.
FIG. 13 is a sectional view of the clamp illustrated in FIG. 12 taken along the lines 13—13.

As abrading bolt 122 is tightened, there may also be a tendency for first arm 26' of clamp 24' to inadvertently move or "walk." A construction of first arm 26' which addresses the problem of walking is shown in FIGS. 12 and 13. In this alternative construction, extension 32 (found on first arm 26) is replaced by a cone-shaped point 125 which is formed on an inner surface 152 which extends outwardly towards second arm 28'. The center line of opening 68 is preferably coaxial with the center line of conical point 125. As clamp 24' is being tightened to utility box 128, conical point 125 penetrates the outer surface of utility box 128, thereby preventing walking.

Conical point 125 is preferably formed of a material with a hardness greater than the hardness of the material to which clamp 24' is being secured. For this purpose, conical point 125 may be a hardened insert having a cylindrical body which snugly fits into a bore formed through first arm portion 26'. In such a case, the remainder of the clamp 24' can be formed of a softer material. Conical point 125 is also preferably of a length so that it cannot penetrate into the inside of utility box 128.

The operation of clamp 24' is illustrated in FIG. 10. Clamp 24' is placed over the top of utility box 128 in the same manner that clamp 24 is placed over utility box 16. Base 30' is adjusted to the width of utility box 128 as described above in connection with base 30. Arms 26' and 28' extend down from base 30' to embrace and bracket electric utility box 128. As abrading bolt 122 is tightened, it pierces dirt, paint and the like on cover of utility box 128 to make electrical contact therewith. Ground wire securing screw 124 holds ground wire 126 in electrical contact with abrading bolt 122. If ground wire 126 is insulated, the insulation at the end of ground wire 128 which is placed into contact with abrading bolt 122 must be stripped. Grounding wire 126 is then connected to telephone interface box 156, thereby completing the electrical connection between telephone interface box 156 and ground G.

For clarity, FIG. 10 shows telephone interface box 156 separately mounted from clamp 24'. In practice, telephone interface box 156 can be mounted to second arm 28' as described above. It should be realized that telephone interface box 156 will be electrically grounded solely by virtue of its mechanical connection to clamp 24' if telephone interface box 156 and any intermediate mounting assemblies (such as mounting plate 82) are made of electrically conductive material. Thus, the invention may be implemented without grounding wire 126, hexagonal head 140 or ground wire securing screw 124.

It should be noted that clamp 24' could employ extension 32 in place of conical point 125. Conical point 125 may be less useful than extension 32 when the electric utility box has a lid such as lid 22 shown in FIG. 1. Clamp 24' could also employ securing device 54 which would be mounted to second arm 28' as described above. In this case, securing device 54 is placed on second arm 28' near base 30, and abrading bolt 122 and ground wire securing screw 124 are positioned further down second arm 28'. For this purpose, a second threaded hole (not illustrated) for receiving abrading bolt 122 is provided on second arm 28'.

It should also be realized that clamp 24' may be used as a ground wire clamp only, and need not have telephone utility box 156 attached. In such circumstances, a second arm 28 need not extend any longer than first arm 26. When not used as for mounting, clamp 24' as described herein resembles adjustable ground wire clamps such as the clamp disclosed in U.S. Pat. No. 5,006,074, referenced previously. However, as discussed below, the present clamp has a superior securing device, which is made possible by the present clamp's base 30 which is more precisely adjustable than existing grounding clamps.

The existing grounding clamp (the "old clamp"), such as disclosed in U.S. Pat. No. 5,006,074, has a plurality of discrete alignment holes which are each separated by a fixed distance. In contrast, the alignment holes of the present clamp slightly overlap, as best seen in FIG. 5. As a result, the old clamp's base is adjustable in coarse graduations which are no more precise than the distance between the alignment holes in the old clamp's base.

Because its base cannot be precisely adjusted, the old clamp relies on a securing bolt mounted in one of the old clamp's arms. As the securing bolt is tightened, its end impinges the side of the utility box to which the old clamp is applied, thereby serving to finely adjust the width of the old clamp.

In contrast, the present clamp 24 has a finely adjustable base 30. As a result, fixed first and second arms 26 and 28 are appropriately spaced for the width of utility box 16 without further adjustment. Consequently, the present clamp 24 can use a rigid securing device, such as sliding plate 24. This rigid securing device provides a mechanical contact with utility box 16 which is stronger and more stable than that provided by a bolt alone. It will be observed that the old clamp uses a bolt for this function. The old clamp cannot rely on a rigid securing device, because the old clamp's securing device must be adjustable in length to compensate for the lack of precision in the old clamp's adjustable base.

While the invention is described in connection with preferred embodiments, it will be understood that it is not intended to limit the invention to these embodiments. On the contrary, it is intended to cover all alternatives, modifications and equivalents as may be included in the spirit and scope of the invention as described by the appended claims.

I claim:

1. An adjustable width clamp for mounting a telephone interface box to a utility box having a width within a specified range, comprising:
   an adjustable width elongated base adjustable for spanning the width range of the utility box, the base comprising first and second elongated members movable with respect to each other for adjusting the width of the base;
   a pair of spaced apart arms extending from the base for positioning the arms adjacent opposite sides of the utility box, with each of the arms being engageable with its adjacent side of the utility box;
   adjustment means for adjusting the width of said base to a width slightly greater than the width of the utility box and for fixing the clamp at a desired width, said adjustment means including a plurality of spaced apart overlapping apertures in said first elongated member and at least one aperture in said second elongated member selectively alignable with each of said overlapping apertures;
   means for securing the clamp to the utility box; and
   means for securing the telephone interface box to the clamp.

2. The adjustable clamp of claim 1 wherein each of said plurality of spaced apart overlapping apertures is threaded to receive a threaded fastener.

3. The adjustable clamp of claim 1 wherein said aperture in said second elongated means is threaded to receive a threaded fastener.

4. The adjustable clamp of claim 1 wherein said adjustment means further includes in one of said elongated members a finger spaced apart from said apertures in that elongated member and insertable into an aperture in the elongated member not having said finger so that the width of the elongated base is fixed.

5. The adjustable clamp of claim 4 wherein said finger is located in said second elongated member.

6. The adjustable clamp of claim 5 wherein the spacing of said overlapping apertures is uniform.

7. The adjustable clamp of claim 6 wherein said finger is spaced from the aperture in said second elongated member an integer multiple of the aperture to aperture spacing of the overlapping apertures in said first elongated member.

8. The adjustable clamp of claim 1 wherein when said first and second elongated members are parallel to each other, and said arms extend at an angle of about 90° from said elongated members.

9. The adjustable clamp of claim 8 further comprising an arm extending from one of said arms in a direction towards the other arm for contacting the side of the utility box.

10. The adjustable clamp of claim 1 wherein said means for securing the clamp to the utility box comprises a sliding plate mounted for limited relative movement on one of said arms and capable of abutting a portion of utility box to secure the clamp thereto.

11. A telephone interface box assembly mounted to an electric utility box, comprising:
    a telephone interface box;
    an adjustable width clamp for securing said telephone interface box to the electric utility box, the adjustable width clamp comprising
    an adjustable width elongated base for spanning the width of the utility box, the base including first and second elongated members movable with respect to each other for adjusting the width of the base;
    a pair of spaced apart arms extending from the base for positioning the arms adjacent opposite sides of the utility box, with each of the arms being engageable with its adjacent side of the utility box;
    adjustment means for adjusting the width of said base to a width slightly greater than the width of the utility box and for fixing the clamp at a desired width, said adjustment means including a plurality of spaced apart overlapping apertures in said first elongated member and at least one aperture in said second elongated member selectively alignable with each of said overlapping apertures;
    means for securing the clamp to the utility box; and
    means for securing the telephone interface box to the clamp.

12. The adjustable clamp of claim 11 wherein each of said plurality of spaced apart overlapping apertures is threaded to receive a threaded fastener.

13. The adjustable clamp of claim 11 wherein said aperture in said second elongated means is threaded to receive a threaded fastener.

14. The adjustable clamp of claim 11 wherein said adjustment means further includes in one of said elongated members a finger spaced apart from said apertures in that elongated member and insertable into an aperture in the elongated member not having said finger so that the width of the elongated base is fixed.

15. An adjustable clamp for mounting and electrically grounding a telephone interface box to a boxed-shaped conductor having a width within a specified range, comprising:
    an adjustable width elongated base adjustable for spanning the width range of the utility box, the base composed of first and second elongated members movable with respect to each other for adjusting the width of the base;
    a pair of spaced apart arms extending from the base for positioning the arms adjacent opposite sides of the utility box, with each of the arms being engageable with its adjacent side of the utility box;
    adjustment means for adjusting the width of said base to a width slightly greater than the width of the utility box and for fixing the clamp at a desired width, said adjustment means including a plurality of spaced apart overlapping apertures in said first elongated member and at least one aperture in said second elongated member selectively alignable with each of said overlapping apertures;
    means for securing the clamp to the utility box;
    means for securing the telephone interface box to the clamp;
    ground means mounted on one of the arms and movable into engagement with the box-shaped conductor for abrading the adjacent side surface of the conductor to form an intimate electrical ground connection therewith.

16. The adjustable clamp of claim 15 further comprising a pointed surface disposed on the arm opposite the arm having the ground means for engagement with the conductor.

17. The adjustable clamp of claim 15 wherein said ground means comprises a threaded opening in the arm and a threaded bolt movable therein for engagement with its adjacent side of the conductor, the threaded bolt having an abrading surface for abrading the side of the conductor to penetrate the outer surface thereof.

18. The adjustable clamp of claim 15 wherein each of said plurality of spaced apart overlapping apertures is threaded to receive a threaded fastener.

19. The adjustable clamp of claim 18 wherein said aperture in said second elongated means is threaded to receive a threaded fastener.

20. The adjustable clamp of claim 15 wherein said adjustment means further includes in one of said elongated members a finger spaced apart from said apertures in that elongated member and insertable into an aperture in the elongated member not having said finger so that the width of the elongated base is fixed.

21. The adjustable clamp of claim 20 wherein said finger is located in said second elongated member.

22. The adjustable clamp of claim 21 wherein the spacing of said overlapping aperture is uniform.

23. The adjustable clamp of claim 22 wherein said finger is spaced from the aperture in said second elongated member an integer multiple of the aperture to aperture spacing of the overlapping apertures.

24. The adjustable clamp of claim 15 wherein when said first and second elongated members are parallel to each other, said arms extend at an angle of about 90° from said elongated members.

25. An adjustable ground clamp for mechanical and electrical connection of a telephone utility box to the sides of a conductor which is to be grounded, comprising:

a first elongated base member terminating in an end portion extending at an angle generally less than or equal to 90° from the first elongated base member;

a second elongated base member overlapping said first base member and terminating in an end portion extending to an angle generally less than or equal to 90° from the second elongated base member;

adjustment means for interconnecting the overlapped elongated base members at different positions to adjust the distance between the end portions to each be positioned closely adjacent a side of the conductor;

ground means mounted on one of the end portions and movable into engagement with its adjacent side of the conductor for abrading the adjacent side surface to form an intimate electrical ground connection therewith; and means for securing the telephone utility box to the clamp.

26. A clamp device for mechanical and electrical connection to the sides of a conductor which is to be grounded, comprising:

a base spanning the conductor, said base having first and second overlapping elongated members, in linear alignment with each other, each member having an arm extending from one end of the base member positionable adjacent one side of the conductor;

said first member having at least one hole, and said second member having a plurality of overlapping holes along its elongated length, where the alignment of each of the plurality of holes with the one hole of said first member determines a different discrete distance of said arms from each other;

securing means receivable through the hole of said first member and any of the plurality of holes of said second member for interconnecting said first and second members; and ground means mounted on one of the end portions and movable into engagement with its adjacent side of the conductor for abrading the adjacent side surface to form an intimate electrical ground connection therewith.

* * * * *